(12) United States Patent
Irita

(10) Patent No.: US 8,118,424 B2
(45) Date of Patent: Feb. 21, 2012

(54) IMAGE RECORDING METHOD, INK SET, RECORDED MATERIAL

(75) Inventor: Kiyoshi Irita, Ashigarakami-gun (JP)

(73) Assignee: Fujifilm Corporation, Tokyo (JP)

( * ) Notice: Subject to any disclaimer, the term of this patent is extended or adjusted under 35 U.S.C. 154(b) by 315 days.

(21) Appl. No.: 12/400,833

(22) Filed: Mar. 10, 2009

(65) Prior Publication Data

US 2009/0233068 A1  Sep. 17, 2009

(30) Foreign Application Priority Data

Mar. 12, 2008 (JP) ................................. 2008-063220

(51) Int. Cl.
*B41J 2/01* (2006.01)

(52) U.S. Cl. .................... 347/105; 347/101; 347/100

(58) Field of Classification Search .................. 347/101, 347/105, 100; 428/195, 32.1
See application file for complete search history.

(56) References Cited

U.S. PATENT DOCUMENTS

| | | | |
|---|---|---|---|
| 6,283,589 B1 | 9/2001 | Gelbart | |
| 2003/0118789 A1* | 6/2003 | Kasahara | 428/195 |
| 2004/0196351 A1* | 10/2004 | Kida et al. | 347/105 |
| 2009/0130312 A1* | 5/2009 | Ono et al. | 428/32.18 |

FOREIGN PATENT DOCUMENTS

| | | |
|---|---|---|
| EP | 1 415 824 A1 | 5/2004 |
| EP | 1 759 858 A1 | 3/2007 |
| JP | 9-254376 A | 9/1997 |
| JP | 2004-136458 A | 5/2004 |

OTHER PUBLICATIONS

EP Communication, dated Jun. 18, 2009, issued in corresponding EP Application No. 09003457.0, 4 pages.

* cited by examiner

*Primary Examiner* — Manish S Shah
(74) *Attorney, Agent, or Firm* — Sughrue Mion, PLLC

(57) ABSTRACT

An image recording method including: applying an aqueous pretreatment composition to a recording medium having a water absorption of 14 ml/m² or less at a contact time of 900 msec in accordance with the Bristow method, the aqueous pretreatment composition containing 10 mass % or more of a water-soluble organic solvent having a solubility parameter value of 13 or less, 1.5 mass % or more of resin particles, and water; forming a blocking layer on the recording medium by drying the aqueous pretreatment composition so that 70 mass % or more of water contained in the aqueous pretreatment composition evaporates within 900 msec from the initiation of the application of the aqueous pretreatment composition; and recording an image by jetting an aqueous ink on the blocking layer, the aqueous ink containing a pigment, resin particles, a water-soluble organic solvent, and water.

8 Claims, 1 Drawing Sheet

IMAGE RECORDING METHOD, INK SET, RECORDED MATERIAL

CROSS-REFERENCE TO RELATED APPLICATION

This application claims priority under 35 USC 119 from Japanese Patent Application No. 2008-063220, the disclosure of which is incorporated by reference herein.

BACKGROUND OF THE INVENTION

1. Field of the Invention

The present invention relates to an image recording method, an ink set, and a recorded material.

2. Description of the Related Art

In the field of recording media and inks for use in inkjet recording, various techniques have been proposed in order to form a high-quality image having improved color density, fixing properties and fineness.

However, since there are various kinds of recording media, including plain paper, there may be problems in that the quality of the recorded image in terms of fixing properties, fineness or the like may not be sufficiently achieved or curling of the recording medium may occur after the recording. For example, when recording is performed using an aqueous ink on a recording medium for use in an ordinary printing process, including "coated paper" such as art paper or coated paper or "non-coated paper" such as book paper, it is known that deformation of paper called curling may caused by severance or reconnection of hydrogen bonds in cellulose fiber contained in the paper, due to the moisture contained in the aqueous ink.

On the other hand, as the inkjet recording speed increases, recording media are required to adapt to a single-path recording system, in which recording can be performed at high speed by a single operation of a recording head, rather than a shuttle-scan system. In the single-path system, the ink needs to be rapidly absorbed in the recording medium. However, when a large amount of ink is applied to the recording medium upon formation of a solid image or the like, curling tends to be caused since a large amount of solvent contained in the ink is absorbed in the recording medium.

Although some techniques have been proposed in order to suppress the curling of the recording medium, for example, by adding an anti-curling agent such as sugar to the ink, or by increasing the forth of a system in a delivery section at which the recording medium is restricted from moving, sufficient effects of suppressing curling have yet be achieved.

Japanese Patent Application Laid-Open (JP-A) No. 2004-136458 discloses a method of suppressing curling by applying a liquid containing alcohol to a recording medium prior to conducting recording with ink, and then recording an image to the recording medium using ink in such a manner that the recording medium is substantially dried at a recording position. However, according to this method, cissing of ink or bleeding in the image may be caused by the alcohol that has been applied to the recording medium before the application of the aqueous ink. If the surface of the recording medium after the alcohol-containing liquid has been applied is dried in order to overcome the above problem, curling caused upon application of ink in the subsequent step may not be prevented.

JP-A No. 9-254376 discloses an inkjet printing method in which a pretreatment liquid is applied to a recording medium in a separate step from that of ink, in order to suppress the penetration of ink in the recording medium. However, according to this method, while suppressing the penetration of a colorant (pigment) in the ink by insolubilizing the colorant by the action of a component such as a cationic active agent in the pretreatment composition, penetration of a solvent (water) in the ink that does not react with the pretreatment composition may not be suppressed. Consequently, curling of the recording medium cannot be suppressed.

U.S. Pat. No. 6,283,589 discloses a method in which a recording medium is made liquid-repellent prior to application of ink. However, according to this method, while suppressing the penetration of ink, the capillary action for a solvent in the ink may be reduced to suppress spreading of ink dots. Therefore, spaces may be formed between the ink dots to significantly reduce the optical density of the image and unevenness due to mislocation of ink dots may be exaggerated, thereby failing to obtain a high-quality image.

In view of the above-mentioned circumstances, the present invention provides an image recording method that can form an image with high reproducibility while suppressing curling, an ink set for use in the image recording method, and a recording material obtained in the image recording method.

It is known that in an image recording process using an aqueous pretreatment composition containing a relatively large amount of water and an aqueous ink in combination, curling, which occurs upon application of the aqueous ink, tends to be caused by the penetration of water or an aqueous solvent into a recording medium to sever hydrogen bonds in cellulose that composes the recording medium. The present invention has been made in view of the findings that by forming a film on the recording medium that can block the penetration of water the like into the recording medium prior to applying the aqueous ink in such a manner that the absorption of solvent that tends to sever the hydrogen bonds in cellulose is suppressed to a low level, curling can be suppressed and a high-quality image can be formed at the same time.

SUMMARY OF THE INVENTION

One aspect of the invention provides an image recording method comprising:

applying an aqueous pretreatment composition to a recording medium having a water absorption of 14 ml/m$^2$ or less at a contact time of 900 msec in accordance with the Bristow method, the aqueous pretreatment composition containing 10 mass % or more of a water-soluble organic solvent having a solubility parameter value of 13 or less, 1.5 mass % or more of resin particles, and water;

forming a blocking layer on the recording medium by drying the aqueous pretreatment composition so that 70 mass % or more of water contained in the aqueous pretreatment composition evaporates within 900 msec from the initiation of the application of the aqueous pretreatment composition; and recording an image by jetting an aqueous ink on the blocking layer, the aqueous ink containing a pigment, resin particles, a water-soluble organic solvent, and water.

DETAILED DESCRIPTION OF THE INVENTION

Figure 1:
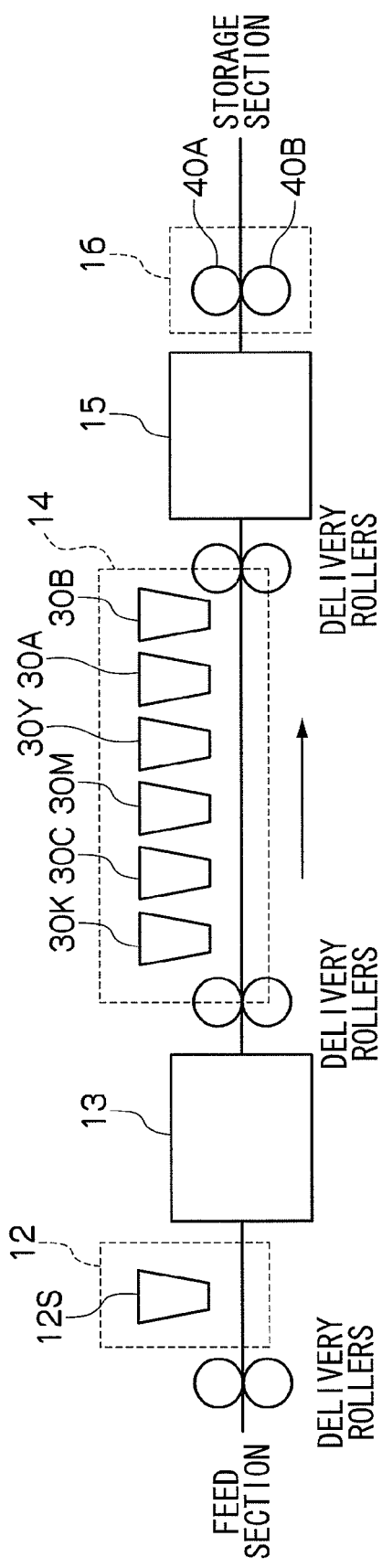
FIG. 1 is a schematic drawing showing an exemplary embodiment of inkjet recording apparatus for use in the image recording method of the present invention.

In the following, details of the image recording method according to the present invention are explained. Through the explanation, the ink set and the recorded material according to the present invention are also described in detail.

<Image Recording Method>

The image recording method according to the present invention includes:

applying an aqueous pretreatment composition to a recording medium having a water absorption of 14 ml/m$^2$ or less at a contact time of 900 msec in accordance with the Bristow method, the aqueous pretreatment composition containing 10 mass % or more of a water-soluble organic solvent having a solubility parameter value of 13 or less, 1.5 mass % or more of resin particles, and water;

forming a blocking layer on the recording medium by drying the aqueous pretreatment composition so that 70 mass % or more of water contained in the aqueous pretreatment composition evaporates within 900 msec from the initiation of the application of the aqueous pretreatment composition; and recording an image by jetting an aqueous ink on the blocking layer, the aqueous ink containing a pigment, resin particles, a water-soluble organic solvent, and water.

In the present invention, a film having an ability of blocking the penetration of a solvent contained in an aqueous ink is formed on a recording medium prior to recording an image, while suppressing the amount of water absorption by the recording medium. This process, however, has two fundamental problems as set forth below.

First, in order to form a uniform film, the material for forming a film needs to be diluted prior to application using a solvent, which solvent may also penetrate in the recording medium to affect the structure thereof. When the solvent used for dilution is water or a water-soluble organic solvent, it may cause curling of the recording medium, similarly to a solvent contained in the aqueous ink. When the solvent used for dilution is an organic solvent that is less apt to sever the hydrogen bonds in cellulose, curling of the recording medium may be suppressed, however, whiteness of the recording medium may decrease due to the penetration of the organic solvent in the recording medium (voids in the recording medium are filled with organic solvent to suppress the reflection of the recording medium) or the strength of the recording medium may decrease. Moreover, since the material for the layer needs to be hydrophobic in order to have a blocking property, organic solvent may not be advantageous in view of uniformly dilute or disperse the material for the blocking layer.

Second, when an image is recorded on a blocking layer using an aqueous ink, fixation of the image may be significantly suppressed. Typically, an image formed from an aqueous ink is fixed mainly by the penetration of a solvent contained in the ink to the recording medium that leads to solidification of the ink in which a colorant is dispersed. This reaction occurs more significantly in the cases of using a pigment ink. Therefore, when an image is formed on a blocking layer using an aqueous ink, solidification reaction due to desolvation may be hardly expected since the amount of penetration of the solvent in the recording medium may be suppressed, thereby hindering the fixation of the image. As a result, there may be problems such as ink bleeding, mislocation of ink dots due to interference, or generation of unevenness due to coalescence of ink dots. Accordingly, in order to promote the fixation of the image, it may be effective to apply an additional fixing agent on the blocking layer prior to applying the aqueous ink. In this case, however, the system may become complicated or the amount of solvent (solvents contained in the fixing agent and ink) to be applied onto the blocking layer may increase to place burden on the drying process.

In view of the above, in the present invention, an aqueous pretreatment composition is prepared by dispersing a certain amount of resin particles for forming a blocking layer in an aqueous medium containing 10 mass % or more of water-soluble organic solvent having a SP value of 13 or less, the thus prepared aqueous pretreatment composition is applied onto a recording medium having a relatively slow penetration rate of the solvent, and dried so that 70 mass % or more of water in the aqueous pretreatment composition is evaporated before the penetration of water contained in the aqueous pretreatment composition progresses or expands.

In the present invention, by including 10 mass % or more of a water-soluble organic solvent having a SP value of 13 or less in the aqueous pretreatment composition and evaporating 70 mass % or more of water contained therein before the penetration of the solvent progresses or expands, the content of water-soluble organic solvent in the total solvent in the aqueous pretreatment composition that penetrates to the paper portion of the recording medium (for example, a cellulose layer in the coated paper) can be increased (for example, from 10 mass % up to 50 mass %). After the aqueous pretreatment composition has been applied, severance of hydrogen bonds in cellulose may be suppressed even if the solvent in the aqueous ink penetrates in the paper portion of the recording medium, thereby suppressing curling of the recording medium. Moreover, reproducibility of the recorded image can be improved and a high-quality image with excellent delineation of lines or details can be obtained.

In the following, details of each process of the image recording method according to the present invention are described.

—Aqueous Pretreatment Composition Application Process—

In this process, an aqueous pretreatment composition containing 10 mass % or more of water-soluble organic solvent having a SP value of 13 or less, 1.5 mass % or more of resin particles and water is applied onto a recording medium having a water absorption of 14 ml/cm$^2$ or less at a contact time of 900 msec according to a Bristow method. Namely, in this process, an aqueous pretreatment composition containing resin particles that enable formation of a film and a water-soluble organic solvent whose polarity is relatively small is applied onto a recording medium having a relatively small penetration rate of a solvent, prior to the application of an aqueous ink.

(Aqueous Pretreatment Composition)

The aqueous pretreatment composition used in the present invention contains a water-soluble organic solvent having a SP value of 13 or less, resin particles, and water. Other ingredients may be contained as necessary.

<Water-Soluble Organic Solvent Having a SP Value of 13 or Less>

The aqueous pretreatment composition used in the present invention contains at least one kind of a water-soluble organic solvent having a SP value of 13 or less, in an amount of 10 mass % or more. In this case, the content of the water-soluble organic solvent having a SP value of 13 or less in the solvent that penetrates in the recording medium (a cellulose layer in the case of coated paper) by the following drying process can be higher than the content of water, thereby suppressing curling of the recording medium.

In other words, when the content of the water-soluble organic solvent having a SP value of 13 or less in the aqueous pretreatment composition is less than 10 mass %, increase in the concentration thereof (condensation) due to evaporation of water may not be sufficient to suppress curling of the recording medium upon application of the aqueous pretreatment composition or aqueous ink, and reproducibility of the recorded image may deteriorate. The content of the water-soluble organic solvent having a SP value or 13 or less in the aqueous pretreatment composition is more preferably from 15 mass % to less than 50 mass %, and further preferably from 20 mass % to less than 40 mass %. When the content of the water-soluble organic solvent having a SP value of 13 or less in the aqueous pretreatment composition is less than 50 mass %, stability of the resin particles as described below may be more favorable.

The water-soluble organic solvent having a SP value or 13 or less may be used alone or in combination of two or more kinds thereof.

When the SP value of the water-soluble organic solvent in the aqueous pretreatment composition exceeds 13, suppression of curling may be difficult even if the concentration of the water-soluble organic solvent in the solvent is increased. The SP value of the water-soluble organic solvent is preferably 10 or more in terms of stability of pigment ink. In this case, dispersion stability of the resin particles in the aqueous pretreatment composition may be more favorable.

The SP value of the water-soluble organic solvent is more preferably from 10.3 to 13, and yet more preferably from 10.5 to 13.

The SP value in the present invention refers to a Hansen solubility parameter. The Hansen solubility parameter is expressed in a three-dimensional space by dividing a solubility parameter introduced by Hildebrand into three components of a dispersion term ($\delta d$), a polarity term ($\delta p$) and a hydrogen-bond term ($\delta h$). In the present invention, the solubility parameter is expressed by $\delta[(cal/cm^3)^{0.5}]$, which is calculated from the following expression:

$$\delta[(cal/cm^3)^{0.5}]=(\delta d^2+\delta p^2+\delta h^2)^{0.5}$$

The values of the dispersion term ($\delta d$), polarity term ($\delta p$) and hydrogen-bond term ($\delta h$) are calculated in many cases by Hansen and his successors, and details of these values may be found in Polymer Handbook, 4th Edition, VII-698-711.

Further, the value of Hansen solubility parameter of many kinds of solvents or resins have been calculated and details of these may be found in Industrial Solvents Handbook, authored by Wesley L. Archer.

When two or more of water-soluble organic solvents are used in the present invention, the requirements of the present invention are satisfied as long as at least one water-soluble organic solvent has a SP value of 13 or less.

The water-soluble organic solvent also plays a roll of helping the formation of a film from the resin particles contained in the aqueous pretreatment composition. From this point of view, the SP value of water-soluble organic solvent is preferably close to the SP value of resin particles contained in the aqueous pretreatment composition. Specifically, the difference between the SP value of water-soluble organic solvent and the SP value of resin particles contained in the aqueous pretreatment composition is preferably 4.5 or less.

It is preferable that the water-soluble organic solvent contained in the aqueous pretreatment composition does not evaporate upon drying in the blocking layer formation process as described later. The boiling point of the water-soluble organic solvent is preferably 180° C. or more, more preferably 200° C. or more, and further preferably 220° C. or more. From the viewpoint of coating ability, the water-soluble organic solvent may be selected based on the physical properties such as viscosity, surface tension or the like.

Specific examples of the water-soluble organic solvent having a SP value of 13 or less include isopentyl alcohol (10), 1,3-butylene glycol diacetate (10.1), propylene glycol monomethyl ether (10.2), 1-octanol (10.3), triethylene glycol (10.3), dipropylene glycol monomethyl ether (10.4), cyclopentanone (10.4), diethylene glycol monobutyl ether (10.5), ethyl cellosolve (10.5), 1-butyl alcohol (10.6), N,N-dimethyl acetoamide (10.8), 1-pentanol (10.9), diethylene glycol monoethyl ether (10.9), propylene glycol monoethyl ether (10.9), 3-methoxy butanol (10.9), propylene glycol phenyl ether (11.1), 1-butanol (11.4), cyclohexanol (11.4), ethylene glycol monobutyl ether (11.5), isopropyl alcohol (11.5), n-propyl alcohol (11.8), N,N-dimethyl formamide (11.9), N-ethyl formamide (11.9), benzyl alcohol (12.1), diethylene glycol (12.1), trioxypropylene glycol (12.1), ethanol (12.7), and polyoxypropylene glyceryl ethers (10.6 to 12.9). The numerical values in the parenthesis refer to the SP values of each compound, and the unit is $(cal/cm^3)^{0.5}$.

The water-soluble organic solvent may be selected in view of imparting other functions than the SP value that are necessary for the water-soluble organic solvent (such as preventing drying, moistening, controlling penetration, or adjusting ink viscosity). Details of these functions are described later.

<Resin Particles>

The aqueous pretreatment composition used in the present invention includes at least one kind of resin particles. By including the resin particles, a film can be formed on the recording medium after the application of the aqueous pretreatment composition. This enables the formation of a blocking layer upon drying in the later-described blocking layer formation process.

Specific examples of the resin particles include polyester resin particles, polyvinyl chloride resin particles, polyvinylidene chloride resin particles, polycarbonate resin particles, and polyacrylic resin particles. These resin particles may be used in the form of latex, and preferable examples thereof include polyester latex, polyvinyl chloride latex, polyvinylidene chloride latex, polycarbonate latex and polyacrylic latex. Among these, polyester latex and polyvinyl chloride latex are more preferable in view of dispersion stability, and polyester latex is yet more preferable.

The resin particles contained in the aqueous pretreatment composition preferably have a SP value of from 9.0 to 11.0, more preferably from 9.5 to 10.5, in view of stably dispersing in a liquid containing 10 mass % or more of water-soluble organic solvent having a SP value of 13 or less, and forming a film upon drying in which the water-soluble organic solvent exists in a condensed state.

Moreover, the resin particles may be selected in view of other functions than the SP value that are necessary for the resin particles (such as dispersibility, solvent-blocking ability, film-formation ability, adhesion or coating ability). Specifically, from the viewpoint of achieving both of stable dispersion and film formation as described above, the resin particles preferably have a glass transition temperature (Tg) of from 20° C. to less than 90° C., more preferably from 30° C. to less than 70° C., and yet more preferably from 40° C. to less than 70° C.

The glass transition temperature (Tg) of the resin particles is a value calculated from the following expression.

$$1/Tg=\Sigma(Xk/Tgk)$$

In the above expression, when the polymer is formed by copolymerization of monomer components of the numbers of kind of n, where k=1 to n, Xk represents a weight fraction of the kth monomer ($\Sigma Xk=1$) and Tgk represents a glass transition temperature (absolute temperature) of a homopolymer of the kth monomer. Σ is the sum of k being from 1 to n. The glass transition temperature of homopolymer of each monomer (Tgk) are widely known and are described in, for example, Polymer Handbook, 3rd Edition, edited by J. Brandrup and E. H. Immergut, published by Wiley-Interscience (1989).

The volume average particle size of the resin particles is preferably from 5 nm to 1 μm, more preferably from 10 nm to 500 nm, yet more preferably from 10 nm to 200 nm, and particularly preferably from 10 nm to 100 nm. The particle size distribution of the resin particles is not particularly limited, and either particles having a broad particle distribution or particles that are nomodispersed may be used. It is also possible to use two or more kinds of monodispersed resin particles in combination.

The weight average molecular weight of latex particles (Mw) is preferably from 8,000 to 100,000, more preferably from 10,000 to 50,000.

The resin particles (especially latex) may be synthesized or prepared by various known synthesis methods or dispersion methods, such as an emulsion-aggregation method or phase-transition method. From the viewpoint of achieving stable dispersion and film formation, a so-called soap-free latex, such as soap-free polyester latex, may also be suitably used. Examples of the commercial product of polyester latex include VYLONAL MD-1200 (Tg: 67° C.) and VYLONAL MD-1100 (Tg: 40° C.), trade name, manufactured by Toyobo Co., Ltd.; and PLAS COAT Z-561 (Tg: 64° C.) and PLAS COAT Z-221 (Tg: 47° C.), trade name, manufactured by Goo Chemical Co., Ltd. Examples of the commercial product of polyvinyl chloride latex include VINIBRAN 900 (Tg: 70° C.) and VINIBRAN 609 (Tg: 43° C.), trade name, manufactured by Nissin Chemical Industry Co., Ltd.

The content of the resin particles is 1.5 mass % or more in the total mass of the aqueous pretreatment composition, and may be determined in consideration of application amount of the pretreatment composition, minimum amount of the composition for blocking a solvent, stable dispersion in the composition, application uniformity of the composition, or the like. When the content of the resin particles is less than 1.5 mass %, the degree of film formation may be small and the blocking ability of the film against a solvent may not be sufficient, thereby failing to suppress curling.

In view of the above, the content of the resin particles is preferably from 1.5 mass % or more to less than 50 mass % in the total mass of the aqueous pretreatment composition. When the content of the resin particles does not exceed 50 mass %, it may be advantageous in terms of abrasion resistance of the formed image. The content of the resin particles is more preferably from 2 mass % to 40 mass %, yet more preferably from 2 mass % to 30 mass % in the total mass of the aqueous pretreatment composition.

<Fixing Agent>

The aqueous pretreatment composition preferably includes a fixing agent for fixing the component in an aqueous ink. By applying the fixing agent on the recording medium prior to the application of the aqueous ink, aggregation of the component in the applied aqueous ink or increase in viscosity of the aqueous ink may be caused. Therefore, interference or bleeding of the aqueous ink, which tends to occur when a film is formed on the recording medium by an aqueous pretreatment composition, may be suppressed and the component in the applied aqueous ink may be fixed, thereby achieving uniform delineation of lines or fine images. In this way, high-quality images may be obtained.

Fixation of the components in the aqueous ink is carried out by fixing the aqueous ink to the recording medium by contacting the fixing agent existing in the dried film with the aqueous ink. More specifically, the fixation is carried out by reducing the dispersion stability of particles (pigment, resin particles or the like) dispersed in the aqueous ink to promote the aggregation of the pigment or resin particles, or to increase the viscosity of the aqueous ink. Namely, for example, the fixation may be conducted by destabilizing the particles (pigment, resin particles or the like), which are stably dispersed in the ink by a weak acidic functional group such as a carboxyl group, by reducing the surface charges of the particles using an acid or the like.

In view of the above, the fixing agent preferably has an ability of destabilizing the particles in the aqueous ink by reducing the surface charges thereof, and is easily resoluble to the ink. More specifically, the fixing agent is preferably an acid having a low pKa, more preferably a water-soluble acid with a valency of 2 or more having a low pKa and high solubility, and yet more preferably an acid having a high buffer ability in a region of pKa that is lower than that of the functional group serving to disperse and stabilize the aqueous ink.

Acids having a valency of 2 or more include those having a first pKa of 4.0 or less, more preferably 3.5 or less. Specific examples thereof include phosphoric acid, oxalic acid, malonic acid, succinic acid, citric acid and phthalic acid. Other acids having a similar pKa or solubility are also applicable.

Among these acids, citric acid, having high water retainability, tends to increase the mechanical strength of the fixed aqueous ink and is thus preferably used in a system in which the mechanical strength is required. On the other hand, malonic acid, having low water retainability, is preferably used in a system in which drying of the aqueous pretreatment composition is desired to be promoted. Further, phthalic acid, having high compatibility with resin particles used in combination (especially polyester resin particles), is preferably used in order to increase the adhesion of fixed aqueous ink to the blocking layer.

As mentioned above, the fixing agent may be selected as appropriate according to other subsidiary factors.

When a fixing agent is used in the aqueous pretreatment composition, the application amount of the fixing agent is not particularly limited as long as it is enough to stabilize the aqueous ink, but preferably 0.3 g/m$^2$ or more, more preferably from 0.3 g/m$^2$ to less than 2 g/m$^2$, and further preferably from 0.5 g/m$^2$ to less than 1 g/m$^2$.

The mass ratio of the fixing agent (F) to the resin particles (L) in the aqueous pretreatment composition (F/L) is preferably from 0.5 to 6.5, more preferably from 1.0 to 5.5, and yet more preferably from 1.6 to 50. When the above mass ratio is 0.5 or more, the fixing agent can exist without being included in the resin film, and thus the fixation of the aqueous ink may be more favorably carried out. When the above mass ratio is 6.5 or less, film formation may be favorably conducted and a blocking effect against a solvent may be obtained, thereby enabling suppression of curling. Moreover, when the above mass ratio is within the above range, it is advantageous to improve abrasion resistance of the formed image since the acid may be efficiently used for the fixation of the ink without leaving much acid to remain.

The aqueous pretreatment composition may include other materials as appropriate according to purposes, to such an extent that the effect of the present invention is not hindered. Specifically, surfactants or other additives may be used and the details thereof are described later.

The pH (25° C.) of the aqueous pretreatment composition is preferably 6 or less in view of carrying out the fixation of the component in the aqueous ink using a fixing agent in a favorable manner, more preferably 4 or less, yet more preferably from 1 to 4, and particularly preferably from 1 to 3. In this case, the pH (25° C.) of the aqueous ink to be described later is preferably 7.5 or more, more preferably 8 or more. In particular, in the present invention, from the viewpoint of improving image density, fineness and inkjet recording speed, it is preferable that the pH (25° C.) of the aqueous ink is 7.5 or more and the pH (25° C.) of the aqueous pretreatment composition is 4 or less.

The method of applying the aqueous pretreatment composition may be any known methods such as an inkjet method, a spray coating method, and a roller coating method. Among these, an inkjet method is preferable since the aqueous pretreatment composition can be selectively applied to a region to which the aqueous ink is applied.

The inkjet method is not particularly limited and may be any known methods such as a charge-control method in which ink is jetted by means of electrostatic attraction; a drop-on-demand method (pressure-pulse method) in which an oscillating pressure of piezo elements is utilized; an acoustic inkjet method in which ink is jetted by radiation pressure by irradiating ink with acoustic beams that have been converted from electric signals; and a thermal inkjet method in which a pressure generated by heating ink to form bubbles therein (BUBBLEJET, trade name). One effective inkjet method is described in JP-A No. 54-59936, in which ink is jetted from a nozzle by an acting force due to a rapid change in volume of ink caused by applying thermal energy to the ink.

Further, the inkjet methods described above include a method in which an ink with a pale color called a photo ink is jetted in a large number but each jetting is performed at a small amount; a method in which inks of substantially same color hue in different densities are used to improve the image quality; and a method in which a clear and colorless ink is used.

The inkjet head used in an inkjet method may be either an on-demand type head or a continuous type head. Inkjet systems include electrochemical transduction systems (such as a single-cavity system, double-cavity system, a vendor system, a piston system, a share-mode system and a shared-wall system), electrothermal transduction systems (such as a thermal inkjet system and a BUBBLE-JET (trade name) system), electrostatic suction systems (such as an electric-field-control system and a slit-jet system), and discharge systems (such as a spark-jet system), and any of these systems are applicable.

The nozzle used for the inkjet recording is not particularly limited and may be selected as appropriate according to applications.

In the process of applying the aqueous pretreatment composition to the recording medium, the temperature of the recording medium may be elevated to a level higher than the minimum film forming temperature of resin particles in the aqueous pretreatment composition, prior to forming the blocking layer. By elevating the temperature of the surface of recording medium to which the blocking layer is formed, evaporation of water in the process of forming the blocking layer can be promoted. Examples of the heating means for heating the recording medium include a method in which a heater is positioned on the side opposite to the surface of recording medium to which the blocking layer is formed (for example, when the recording medium is conveyed by a conveyor, under the conveyor), and a method in which an infrared heater is used, or the like. Two or more of these methods may be used in combination.

<Recording Medium>

The image recording method according to the present invention has a water absorption according to a Bristow method at a contact time of 900 msec (hereinafter, simply referred to as "900 msec water absorption" sometimes) of 14 ml/m$^2$. By using a recording medium having a relatively small amount of water absorption as defined above, the amount of penetration of a solvent during the time form the initiation of the application of the aqueous pretreatment composition to the completion of the drying of blocking layer (i.e., 900 msec) can be suppressed.

When the above-defined 900 msec water absorption exceeds 14 ml/m$^2$, the speed of penetration of the solvent into the recording medium may be faster relative to the speed of evaporation of water upon drying in the process of forming a blocking layer. In this case, the solvent may penetrate in the recording medium (a cellulose layer in the case of coated paper) while the aqueous pretreatment composition contains water at high content, thereby failing to suppress curling.

In view of suppressing the curling, the 900 msec water absorption is preferably 12 ml/m$^2$ or less. In view of improving the abrasion resistance or fineness of the formed image, the lower limit of 900 msec water absorption is preferably 3 ml/m$^2$.

Bristow Method

The Bristow method is a method most commonly used for measuring the absorption amount of a liquid in a short time, and it is adopted by Japan Technical Association of the Pulp and Paper Industry (Japan TAPPI). Details of the measurement process are described in Japan TAPPI No. 51, Method of Measuring Liquid Absorption of Paper and Cardboard. The water absorption may also be measured by a simplified method using an automatic scanning absorptometer described in Japan TAPPI Journal, vol. 48, May 1994, pp. 88-92. In the present invention, the water absorption is measured using an automatic scanning absorptometer at a contact time of 900 milliseconds. The portion of aqueous ink that has penetrated through to reach the backside of recording medium is excluded from the calculation.

In the present invention, the recording medium is not particularly limited and may be arbitrarily selected as long as the 900 msec absorption is 14 ml/m$^2$ or less. For example, common print media mainly composed of cellulose such as coated paper or art paper for use in conventional offset printing may be used. When a print medium primarily composed of cellulose is used in a conventional inkjet method with an aqueous ink, curling of recording medium tends to occur due to penetration of a solvent such as water or water-soluble organic solvent and the image quality is significantly deteriorated. However, according to the method of the present invention, curling may be suppressed and a high-quality image may be recorded.

Commercial products may be used as the recording medium, and examples thereof include coated paper (A2 and B2) such as OK TOPCOAT+, trade name, manufactured by Oji Paper Co., Ltd. (900 msec absorption: 4 ml/m$^2$); AURORACOAT, trade name, manufactured by Nippon Paper Industries Co., Ltd. (900 msec absorption: 7 ml/m$^2$); ULITE, trade name, manufactured by Nippon Paper Industries Co., Ltd. (900 msec absorption: 11 ml/m$^2$), and art paper (A1) such as TOKUBISHI ART, trade name, manufactured by Mitsubishi Paper Mills Limited (900 msec absorption: 4 ml/m$^2$). Photograph paper for inkjet recording, such as resin-coated paper (coated with polyethylene) onto which an image receiving layer is formed, are also applicable.

Among the above print media, coated paper is preferable. Print media composed of a base paper formed from cellulose and a coating layer formed on the base paper are included in the coated paper.

—Blocking Layer Forming Process—

In the blocking layer forming process, the aqueous pretreatment composition, which has been applied on the recording medium in the aqueous pretreatment composition application process, is dried so that at least 70 mass % of water (total amount) contained in the aqueous pretreatment composition evaporates within 900 msec from the initiation of application of the aqueous pretreatment composition, thereby forming a blocking layer on the recording medium.

In this process, by drying the aqueous pretreatment composition so that at least 70 mass % of water (total amount) contained in the aqueous pretreatment composition is evaporated within 900 msec from the initiation of the application of the aqueous pretreatment composition, the concentration of the aqueous pretreatment composition can be adjusted so that a water-soluble organic solvent in the total solvent in the aqueous pretreatment can be condensed, as well as forming a blocking layer. In this way, penetration of the solvent in the recording medium may be controlled so that the hydrogen bonds in cellulose are not severed.

The blocking layer formed in the above process may include a small amount or water or aqueous solvent.

Further, by conducting the above drying (evaporation) process, a phenomenon that a colorant in the aqueous ink after having aggregated is suspended in the aqueous pretreatment composition without adhering to the recording medium (colorant suspension) may be prevented, and the dots of aqueous ink that form an image may be fixed to a desired position.

The "initiation of application of the aqueous pretreatment composition" refers to a time point at which the aqueous pretreatment composition comes into contact with the recording side of the recording medium, for example, in the case of conducting recording by an inkjet method, the time point at which ink droplets come into contact with the recording side of the recording medium.

The amount of evaporation of water can be determined as the difference between (1) the mass of the aqueous pretreatment composition that has been applied to the recording medium and (2) the mass of the recording medium including the aqueous pretreatment composition applied thereto from which the mass of the recording medium itself has been subtracted. The amount of evaporation of water is preferably 70 mass % or more from the viewpoint of suppressing curling. The upper limit of the amount of evaporation of water in this process is not specifically limited, but is preferably 98 mass % in view of recording time.

The method for drying the recording medium is not specifically limited, as long as 70 mass % or more of water contained in the aqueous pretreatment composition can evaporate within 900 msec after the initiation of application of the aqueous pretreatment composition. Examples of the method of drying include known heating means such as a heater, air blowers that blow hot or cool air, or a combination of these means. Among these, a means that can elevate the temperature of the surface of the film formed from the aqueous pretreatment composition during the drying process is preferable, and specific examples thereof include heaters that can heat the recording medium while contacting the recording medium, and heaters that can heat the aqueous pretreatment composition without contacting the recording medium (such as an infrared heater).

Since the surface temperature of the recording medium may change according to the type of recording medium (material, thickness or the like) or environmental temperature, it is preferable to form the blocking layer while controlling the surface temperature by a system including a measurement section that measures the surface temperature of recording medium and a control section that receives the feedback of the temperature measured by the measurement section. The measurement section for measuring the surface temperature of recording medium is preferably a contact-type or non-contact type thermometer.

—Image Recording Process—

In the image recording process, an image is recorded on the blocking layer that has been formed in the aforementioned blocking layer forming process, by applying an aqueous ink containing a pigment, resin particles, water-soluble organic solvent and water by an inkjet method. Details of the inkjet method are described in the above section concerning the application of aqueous pretreatment composition.

In the present invention, since the image is formed by applying an aqueous ink on the blocking layer, a high-quality image with excellent reproducibility can be recorded while suppressing the occurrence of curling. Moreover, the recording can be performed at high speed. For example, specifically, recording can be performed by a single-path inkjet method in which an image having a fineness of as high as 1200 dpi or more is recorded at a delivery speed of as high as 500 nm/second.

Additionally, when the aqueous pretreatment composition includes a fixing agent, at least the pigment and resin particles in the aqueous ink are fixed when the aqueous ink comes into contact with the blocking layer, thereby suppressing gathering, bleeding, ink dot interference or the like to form an image with even higher reproducibility.

The aqueous ink may be used for forming not only a single-color image but also a multi-color image (such as a full-color image) by selecting one or more aqueous ink of a desired color. When recording a full-color image, inks having a color tone of magenta, cyan and yellow may be used. Further, an ink having a color tone of black may be used in combination in order to control the color tone of the image. Moreover, ink compositions having a color tone of red, green, blue, white or the like, or ink composition having a so-called specific color in the field of printing may also be used.

The color tone of the above ink compositions may be changed by changing the color tone of a pigment used as a colorant. Details of the aqueous ink will be described later.

—Other Processes—

The method of the present invention may further include a drying process in which the solvent (especially water) in the aqueous ink is removed by drying. Alternatively, or in combination with the drying process, a process may be provided in which the solvent in the aqueous ink is removed by absorbing the solvent by contacting a roller made of a porous material or the like with the surface of the recording medium.

Further, a fixing process may be provided in which the image formed on the recording medium is fixed by at least one of a pressure-application means that applies pressure to the image or a heating means that heats the image. For example, the fixation may be conducted by contacting or pressing a heated roll or plate to the surface of the recording medium. By providing the fixation process, resin particles included in the aqueous ink and blocking layer can be melted to improve the adhesion between the components in the aqueous ink and the blocking layer, and the adhesion between the blocking layer and the recording medium. In this case, the heating is preferably conducted at a temperature higher than the glass transition temperature of resin particles in the aqueous ink and the glass transition temperature of resin particles in the aqueous pretreatment composition.

Inkjet Recording Apparatus

Next, the inkjet recording apparatus favorably used for the image recording method of the present invention will be explained in detail with reference to FIG. 1. FIG. 1 is a schematic view showing the entire configuration of an inkjet recording apparatus.

As shown in FIG. 1, the inkjet recording apparatus includes a pretreatment composition application unit 12, having a pretreatment composition ejection head 12S that ejects the aqueous pretreatment composition; a pretreatment composition drying zone 13, having a heating unit (not shown) that dries the aqueous pretreatment composition; and an ink ejection unit 14 that ejects the aqueous ink; and an ink drying zone 15 at which the ejected aqueous ink is dried. Optionally, an image fixation unit 16 is provided downstream of ink drying zone 5 in a delivery direction of recording medium, in order to further fixing the image formed on the recording medium.

The recording medium that has been supplied to the inkjet recording apparatus is delivered by delivery rollers from a feed section in which recording media are stored to a storage section, through pretreatment composition application unit 12, pretreatment composition drying zone 13, ink ejection unit 14, ink drying zone 15, and optionally image fixation unit 16 in this order. The delivery of the recording medium may be conducted by a method using a drum-shaped member or a belt-shaped member, or a method using a stage, other than the method using delivery rollers as shown in FIG. 1.

The delivery rollers may include at least one drive roller that is rotated by the force of a motor (not shown). By rotating the drive roller at a constant rate, recording media can be delivered in a predetermined direction, in a predetermined delivery amount.

Pretreatment composition application unit 12 has pretreatment composition ejection head 12S, which ejects the aqueous pretreatment composition from nozzles positioned to face the recording side of recording medium so that the aqueous pretreatment composition can be applied onto the recording medium in the form of droplets. The pretreatment composition application unit 12 is not limited to a method of ejecting the composition from a head in the form of a nozzle, but may apply a method of coating the composition by a roller. According to the coating method, the aqueous pretreatment composition may be readily applied to the almost entire area of recording side of the recording medium, including an image portion to which ink droplets is to be applied by ink ejection unit 14. In order to apply the aqueous pretreatment composition to the recording medium with a uniform thickness, an air-knife may be used for the coating or a member having an acute angle may be positioned with a gap corresponding to the predetermined amount of aqueous pretreatment composition, between the member and the recording medium.

Pretreatment composition drying zone 13 is positioned downstream of pretreatment composition application unit 12 in a delivery direction of the recording medium. Pretreatment composition drying zone 13 may include known heating means such as a heater or air blower such as a drier, or a combination thereof. The heating may be conducted by heating the side of recording medium opposite to the blocking-layer side thereof by a heater or the like that is positioned, for example, under a delivery system that delivers the recording medium positioned thereon; blowing the blocking-layer side of the recording medium with warm or hot air; or using an infrared heater. These methods may be used alone of in combination.

Since the surface temperature of the recording medium may change according to the type of recording medium (material, thickness or the like) or environmental temperature, it is preferable to form the blocking layer while controlling the surface temperature by a system including a measurement section that measures the surface temperature of the recording medium and a control section that receives the feedback of the temperature measured by the measurement section. The measurement section for measuring the surface temperature of the recording medium is preferably a contact-type or non-contact type thermometer.

The solvent may be removed by using a solvent-removing roller. Alternatively, a method in which the excess solvent is removed by an air knife is also applicable.

Ink ejection unit 14 is positioned downstream of pretreatment composition drying zone 13 in a delivery direction of the recording medium. Ink ejection unit 14 includes recording heads (ink ejection heads) 30K, 30C, 30M and 30Y, each connecting to an ink reservoir that stores ink of black (K), cyan (C), magenta (M) or yellow (Y) (not shown). Each ink reservoir stores an aqueous ink containing a pigment of corresponding color, resin particles, water-soluble organic solvent and water, and supplies the ink to ink ejection heads 30K, 30C, 30M and 30Y upon recording of an image. Further, as shown in FIG. 1, the recording apparatus may include recording heads 30A and 30B for ejecting ink having a specific color.

Ink ejection heads 30K, 30C, 30M and 30Y eject inks of respective colors corresponding to the image to be formed, through ejection nozzles that are positioned so as to face the recording side of recording medium. In this way, ink of each color can be applied to the recording side of recording medium to form a color image.

Pretreatment composition ejection head 12S and ink ejection heads 30K, 30C, 30M, 30Y, 30A and 30B are in the form of full-line head in which a number of nozzles are aligned in a maximum recording width direction of the image to be formed on the recording medium. In this form, image recording can be carried out at higher speed compared to serial-type recording in which recording is carried out by a short-length shuttle head scanning in a width direction of the recording medium (in a direction perpendicular to a delivery direction of the recording medium). In the present invention, any recording methods are applicable such as the above serial-type recording or other methods in which the recording is performed at a relatively high speed, including a single-path recording in which a line is formed at a single round of scanning in a main-scanning direction. In the image recording method of the present invention, a high-quality image having high reproducibility may be obtained even in the single-path system.

In the present embodiment, pretreatment composition ejection head 12S and ink ejection heads 30K, 30C, 30M, 30Y, 30A and 30B are described as having the same structure.

The application amount of aqueous pretreatment composition and aqueous ink may be adjusted as appropriate. For example, the amount of aqueous pretreatment composition may be changed in order to adjust the properties such as viscosity of the aggregation formed upon mixing of the aqueous pretreatment composition and aqueous ink, according to the type of the recording medium.

Ink drying zone 15 is positioned downstream of ink ejection unit 14 in a delivery direction of the recording medium. Ink drying zone 15 may have a similar structure to that of pretreatment composition drying zone 13.

After drying the image, fixation may be conducted by image fixation unit 16 in order to further strengthen the fixing properties of the recording medium.

Image fixation unit 16 is positioned downstream of ink drying zone 15 in a delivery direction of the recording medium. Image fixation unit 16 includes a pair of fixation rollers 40A and 40B in contact with each other with pressure.

By passing the recording medium through fixation rollers 40A and 40B, the image formed on the recording medium is pressed and heated to improve the fixing properties thereof. Fixation rollers 40A and 40B are preferably a combination of a pressing roller and a heating roller, but the present invention is not limited thereto.

The inkjet recording apparatus may further include a heating means on the delivery path from the supply section to the storage section, in order to conduct a heat treatment to the recording medium. For example, by providing a heating means to a desired position, such as upstream of pretreatment composition drying zone 13 or between ink ejection unit 15 and ink drying zone 15, the temperature of the recording medium can be increased to effectively perform drying or fixation of the recording medium.

<Ink Set>

The ink set of the present invention is used in the aforementioned image recording method of the present invention, and includes an aqueous pretreatment composition and an aqueous ink, the aqueous pretreatment composition containing 10 mass % or more of water-soluble organic solvent having a SP value of 13 or less, 1.5 mass % or more of resin particles and water, and the aqueous ink containing a pigment, resin particles, water-soluble organic solvent and water.

The ink set of the present invention includes, as mentioned above, an aqueous pretreatment composition in which resin particles capable of forming a film having a blocking property are dispersed in an aqueous solvent containing 10 mass % or more of water-soluble organic solvent having a SP value of 13 or less, which aqueous pretreatment composition is applied to a recording medium having a relatively slow penetration rate of a solvent, and forms an image by an aqueous ink after evaporating 70% or more of water contained in the aqueous pretreatment composition by drying before the penetration of moisture in the aqueous pretreatment composition progresses or expands. According to the ink set of the present invention, a high-quality image having excellent delineation of lines or details may be obtained while suppressing curling and improving reproducibility of the recorded image.

The aqueous pretreatment composition contains resin particles, and is able to form a film that suppresses and blocks the penetration of a solvent (including water and water-soluble organic solvent). The aqueous pretreatment composition preferably contains a fixing agent that can fix the aqueous ink to a blocking layer formed from the aforementioned film formation process. In this case, the content of fixing agent in the aqueous pretreatment composition is preferably 5 to 30 mass %, more preferably from 7 to 25 mass % in the total mass of the aqueous pretreatment composition. Details of the components contained in the aqueous pretreatment composition such as water-soluble organic solvent having a SP value of 13 or less, resin particles or the like, and the contents thereof are as described above.

—Aqueous Ink—

The aqueous ink includes a pigment, resin particles, water-soluble organic solvent and water. Other components such as a dispersant or an additive may also be used as necessary. In the following, details of the components of aqueous ink are described.

(Resin Particles)

The aqueous ink used in the present invention contains at least one kind of resin particles. By including the resin particles, fixing properties of aqueous ink to a recording medium and abrasion resistance of the recording medium may be mainly improved. Further, the resin particles has a function of fixing an image formed from the aqueous ink by increasing the viscosity of aqueous ink by causing aggregation thereof, or by dispersing and destabilizing the aqueous ink upon contact with the fixing agent as described above. The resin particles are preferably dispersed in water or water-soluble organic solvent.

Materials for the resin particles include fine particles of styrene resin, acrylic resin, vinyl acetate resin, and polyester resin. These fine particles may be used in the form of latex, such as styrene latex, acrylic latex, vinyl acetate latex, polyester latex or the like. Among these, acrylic latex is most preferable.

As the resin particles (especially latex) having a function of increasing the viscosity of ink by causing aggregation or dispersing to destabilize the ink upon contact with the aqueous pretreatment composition containing a fixing agent, resin particles having a zeta potential that can change in response to the change in pH are preferable, and examples thereof include resin particles having a carboxyl group on the surface thereof and having a disperse stability that is lowered as the pH value is lowered. Soap-free latex, having a high degree of reactivity, is also suitable.

The glass transition temperature (Tg) of the latex particles is not particularly limited, but preferably not less than room temperature, specifically 30° C. or more, more preferably 40° C. or more, and yet more preferably 50° C. or more.

The Tg may be calculated by the following expression, as mentioned in the above section concerning the aqueous pretreatment composition.

$$1/Tg = \Sigma(Xk/Tgk)$$

The average particles size of latex particles is preferably from 10 nm to 1 μm, more preferably from 10 nm to 500 nm, yet more preferably from 20 nm to 200 nm, and particularly preferably from 50 nm to 200 nm. The particle size distribution of latex particles is not particularly limited, and either latex particles having a broad particle size distribution or latex particles that are monodispersed may be used. Further, two or more kinds of monodispersed latex particles may be used in combination.

Latex particles that are commercially available may also be used, and specific examples thereof include ARON HD-5 (trade name, Tg: 45° C., manufactured by Toagosei Co., Ltd.), JONCRYL 537 (trade name, Tg: 49° C., manufactured by BASF Japan, Ltd.), JONCRYL 775 (trade name, Tg: 37° C., manufactured by BASF Japan, Ltd.), and JURIMER ET-410 (trade name, Tg: 44° C., manufactured by Nihonjunyaku Co., Ltd.).

(Pigment)

The aqueous ink used in the present invention includes at least one kind of pigment. The type of pigment is not particularly limited and, for example, the pigment may be either organic or inorganic.

Organic pigments include azo pigments, polycyclic pigments, dye chelates, nitro pigments, nitroso pigments, aniline black, and the like. Among these, azo pigments and polycyclic pigments are more preferable.

Inorganic pigments include titanium oxide, iron oxide, calcium carbonate, barium sulfate, aluminum hydroxide, barium yellow, cadmium red, chromium yellow, carbon black, and the like. Among these, carbon black is most preferable.

Organic pigments having an orange or yellow color include C. I. Pigment Orange 31, C. I. Pigment Orange 43, C. I. Pigment Yellow 12, C. I. Pigment Yellow 13, C. I. Pigment Yellow 14, C. I. Pigment Yellow 15, C. I. Pigment Yellow 17, C. I. Pigment Yellow 74, C. I. Pigment Yellow 93, C. I. Pigment Yellow 94, C. I. Pigment Yellow 128, C. I. Pigment Yellow 138, C. I. Pigment Yellow 151, C. I. Pigment Yellow 155, C. I. Pigment Yellow 180 and C. I. Pigment Yellow 185.

Organic pigments having a magenta or red color include C. I. Pigment Red 2, C. I. Pigment Red 3, C. I. Pigment Red 5, C. I. Pigment Red 6, C. I. Pigment Red 7, C. I. Pigment Red 15, C. I. Pigment Red 16, C. I. Pigment Red 48:1, C. I. Pigment Red 53:1, C. I. Pigment Red 57:1, C. I. Pigment Red 122, C. I. Pigment Red 123, C. I. Pigment Red 139, C. I. Pigment Red 144, C. I. Pigment Red 149, C. I. Pigment Red 166, C. I. Pigment Red 177, C. I. Pigment Red 178, C. I. Pigment Red 222 and C. I. Pigment Violet 19.

Organic pigments having a green or cyan color include C. I. Pigment Blue 15, C. I. Pigment Blue 15:2, C. I. Pigment Blue 15:3, C. I. Pigment Blue 15:4, C. I. Pigment Blue 16, C. I. Pigment Blue 60 and C. I. Pigment Green 7, and aluminum phthalocyanine pigments crosslinked with siloxane described in U.S. Pat. No. 4,311,775.

Organic pigments having a black color include C. I. Pigment Black 1, C. I. Pigment Black 6 and C. I. Pigment Black 7.

The average particle size of organic pigment is preferably small in view of transparency or color reproducibility, but preferably large in view of lightfastness. In order to satisfy both of the above requirements, the average particle size of organic pigment is preferably from 10 to 200 nm, more preferably from 10 to 150 nm, and further preferably from 10 to 100 nm. The particle size distribution of the organic pigment is not particularly limited, and either those having a broad particle size distribution or a pigment that is monodispersed may be used. Alternatively, two or more of monodispersed organic pigments may be used in combination.

The content of the pigment is preferably from 1 to 25 mass %, more preferably from 2 to 20 mass %, further preferably from 5 to 20 mass %, and particularly preferably from 5 to 15 mass %, in the total mass of the aqueous ink.

(Dispersant)

The aqueous ink of the present invention may contain at least one kind of a dispersant. The dispersant for dispersing a pigment may be either a polymeric dispersant or a low-molecular surfactant-type dispersant. The polymeric dispersant may be either water-soluble or water-insoluble.

The low-molecular surfactant-type dispersant can disperse a pigment in an aqueous medium in a stable manner, while maintaining the viscosity of the ink at low level. The low-molecular surfactant-type dispersant typically has a molecular weight of 2,000 or less, preferably from 100 to 2,000, and more preferably from 200 to 2,000.

The low-molecular surfactant-type dispersant as mentioned above has a hydrophilic group and a hydrophobic group. The number of hydrophilic group and hydrophobic group in a molecule is not particularly limited as long as at least one of each group is contained in the molecule, and two or more kinds of hydrophilic group or hydrophobic group may be contained in combination. A linkage group that links the hydrophilic group and hydrophobic group may also be present in the molecule.

The hydrophilic groups include anionic groups, cationic groups, nonionic groups, and betaine groups including the aforementioned groups in combination.

The anionic groups are not particularly limited as long as the group has a negative charge, but preferably a phosphoric group, a phosphonic group, a phosphinic group, a sulfate group, a sulfonic group, a sulfinic group or a carboxyl group, more preferably a phosphoric group or a carboxyl group, and further preferably a carboxyl group.

The cationic groups are not particularly limited as long as the group has a positive charge, but preferably organic cationic group, more preferably a cationic group of nitrogen or phosphorous, and further preferably pyridinium cationic group or ammonium cationic group.

The nonionic groups include a moiety of polyethylene oxide, polyglycerin or a sugar unit.

The hydrophilic groups are preferably an anionic group as described above.

When the low-molecular surfactant-type dispersant has an anionic hydrophilic group, the dispersant preferably has a pKa of 3 or more, in terms of promoting aggregation reaction upon contacting with an acidic pretreatment composition. The pKa mentioned here is an experimental value calculated from a titration curve obtained by titrating a solution containing tetrahydrofuran and water at a ratio of 3:2 (THF:water, V/V), to which 1 mmol/L of a low-molecular surfactant-type dispersant is dissolved, with an acid or alkali aqueous solution. When the pKa of low-molecular surfactant-type dispersant is 3 or more, 50% or more of anionic groups theoretically becomes undissociated upon contact with a liquid having a pH of around 3. Accordingly, the solubility to water of the dispersant is significantly reduced to cause aggregation reaction, namely, the aggregation reactivity is improved. From this point of view, the low-molecular surfactant-type dispersant preferably has a carboxyl group as the anionic group.

The hydrophobic group has a hydrocarbon structure, fluorocarbon structure, silicone structure or the like, and the hydrocarbon structure is particularly preferable. The hydrophobic group may have either a straight-chain structure or a branched structure. Further, the hydrophobic group may have one or more chain, and when there are two or more chains, two or more kinds of hydrophobic group may exist. The hydrophobic group is preferably a hydrocarbon group having a carbon number of from 2 to 24, more preferably from 4 to 24, and yet more preferably from 6 to 20.

The water-soluble dispersants include a hydrophilic polymeric compound. Natural hydrophilic polymeric compounds include plant polymers such as gum arabic, gum tragacanth, guar gum, gum karaya, locust bean gum, arabinogalactan, pectin and quince seed starch, algae polymers such as alginic acid, carrageenan and agar, animal polymers such as gelatin, casein, albumin and collagen, and microbial polymers such as xanthene gum and dextran.

Hydrophilic polymeric compound obtained by modifying a natural raw material include fibrous polymers such as methyl cellulose, ethyl cellulose, hydroxy ethyl cellulose, hydroxy propyl cellulose and carboxy methyl cellulose, starch polymers such as sodium starch glycolate and sodium starch phosphate, and algar polymers such as sodium alginate and propylene glycol alginate.

Synthetic hydrophilic polymeric compounds include vinyl polymers such as polyvinyl alcohol, polyvinyl pyrrolidone and polyvinyl methyl ether, acrylic resins such as non-crosslinked polyacrylamide, polyacrylic acid or an alkali metal salt thereof, and water-soluble styrene acrylic acid, water-soluble styrene maleic acid resin, water-soluble vinyl naphthalene acrylic resin, water-soluble vinyl naphthalene maleic acid resins, alkali metal salts of polyvinyl pyrrolidone, polyvinyl alcohol and a formardehyde condensate of β-naphthalene sulfonic acid, polymeric compounds having a salt of cationic functional group such as a quaternary ammonium group or an amino group in a side chain, and natural polymeric compounds such as shellac.

Among these, hydrophilic polymeric compounds to which a carboxyl group is introduced, such as homopolymers of acrylic acid, methacrylic acid or styrene acrylic acid and copolymers including other kind of monomer having a hydrophilic group.

The water-insoluble dispersants include a polymer having both hydrophilic and hydrophobic moieties, such as styrene-(meth)acrylic acid copolymer, styrene-(meth)acrylic acid-(meth)acrylate copolymer, (meth)acrylate-(meth)acrylic acid copolymer, polyethylene glycol(meth)acrylate-(meth)acrylic acid copolymer, vinylacetate-maleic acid copolymer, and styrene-maleic acid copolymer.

The weight average molecular weight of the dispersant is preferably from 3,000 to 100,000, more preferably from 5,000 to 50,000, further preferably from 5,000 to 40,000, and yet further preferably from 10,000 to 40,000.

The mixing ratio by mass (p:s) of the pigment (p) and the dispersant (s) is preferably from 1:0.06 to 1:3, more preferably from 1:0.125 to 1:2, and further preferably from 1:0.125 to 1:1.5.

(Water-Soluble Organic Solvent)

The aqueous ink used in the present invention includes at least one kind of water-soluble organic solvent. By including the water-soluble organic solvent, effects of preventing drying, moistening, promoting penetration or the like may be obtained. In order to prevent drying, the solvent may be used as a drying inhibitor for preventing nozzle clogging due to aggregation of ink that has attached and dried at an ejection port of a nozzle. In terms of preventing drying or moistening, a water-soluble organic solvent having a lower vapor pressure than that of water is preferably used. In terms of promoting penetration, the solvent may be used as a penetration promoter for improving the penetration ability of ink in a recording medium.

As a drying inhibitor, the water-soluble organic solvent preferably has a lower vapor pressure than that of water. Examples of such solvents include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin and trimethylol propane; lower alkyl ethers of polyhydric alcohol such as ethylene glycol monomethyl ether, ethylene glycol monoethyl ether, diethylene glycol monomethyl ether, diethylene glycol monoethyl ether, triethylene glycol monoethyl ether and triethylene glycol monobutyl ether; heterocyclic compounds such as 2-pyrrolidone, N-methyl-2-pyrrolidone, 1,3-dimethyl-2-imidazolidine and N-ethyl morpholine; sulfur-containing compounds such as sulfolane, dimethyl sulfoxide and 3-sulfolene; polyfunctional compounds such as diacetone alcohol and diethanol amime; and urea derivatives.

Among these, polyhydric alcohols such as glycerin and diethylene glycol are preferable.

The drying inhibitor may be used alone or in combination of two or more. The content of drying inhibitor is preferably from 10 to 50 mass % in the aqueous ink.

As the penetration promoter, the water-soluble organic solvent is favorably used in order to promote the penetration of aqueous ink in a recording medium (such as printing paper). Examples of such solvents include alcohols such as ethanol, isopropanol, butanol, diethylene glycol monobutyl ether, triethylene glycol monobutyl ether and 1,2-hexanediol, sodium lauryl sulfate, sodium oleate, and nonionic surfactants.

The penetration promoter may be used alone or in combination of two or more. The content of penetration promoter is preferably from 5 to 30 mass % in the aqueous ink. The penetration promoter is used preferably at an amount in a range in which image bleeding or print through is not caused.

The water-soluble organic solvent may be used also for adjusting the viscosity of ink. Examples of the water-soluble organic solvent that may be used as a viscosity adjuster include alcohols such as methanol, ethanol, propanol, isopropanol, butanol, isobutanol, sec-butanol, t-butanol, pentanol, hexanol, cyclohexanol and benzyl alcohol; polyhydric alcohols such as ethylene glycol, diethylene glycol, triethylene glycol, polyethyelene glycol, propylene glycol, dipropylene glycol, polypropylene glycol, butylene glycol, hexane diol, pentane diol, glycerin, hexane triol and thiodiglycol; glycol derivatives such as ethylene glycol monomethyl ether, ethylene glycol monoethyl ether, ethyelene glycol monobutyl ether, diethyelene glycol monomethyl ether, diethylene glycol monobutyl ether, propylene glycol monomethyl ether, propylene glycol monobutyl ether, dipropylene glydol monomethyl ether, triethyelene glycol monomethyl ether, ethylene glycol diacetate, ethylene glycol monomethyl ether acetate, triethylene glycol monomethyl ether, triethylene glycol monoethyl ether and ethylene glycol monophenyl ether; amines such as ethanol amine, diethanol amine, triethanol amine, N-methyl diethanol amine, N-ethyl diethanol amine, morpholine, N-ethyl morpholine, ethylene diamine, diethylene triamine, triethylene tetramine, polyethylene imine and tetramethyl propylene diamine; and other polar solvents such as formamide, N,N-dimethyl formamide, N,N-dimethyl acetoamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone. These solvents may be used alone or in combination of two or more.

(Other Additives)

The aqueous ink used in the present invention may further include other additives than the aforementioned components, such as known additives including a drying inhibitor (moistener), discoloration inhibitor, emulsion stabilizer, penetration promoter, UV absorber, antiseptic agent, antimildew agent, pH adjuster, surface tension adjuster, antifoaming agent, viscosity adjuster, dispersant, dispersion stabilizer, antirustic agent and chelate agent. When the ink is aqueous, these additives are usually directly added to the ink. When an oily dye is used in a dispersion, these additives are usually added to the dispersion after the dye has been dispersed therein. However, these additives may be added in an oil phase or aqueous phase during the preparation of the dispersion.

The UV absorbers may be used for improving the storability of an image, and examples thereof include benzotriazole compounds described in JP-A Nos. 58-185677, 61-190537, 2-782, 5-197075 and 9-34057; benzophenone compounds described in JP-A Nos. 46-2784, 5-194483 and U.S. Pat. No. 3,214,463; cinnamic compounds described in Japanese Patent Nos. 48-30492, 56-21141 and JP-A No. 10-88106; triazine compounds described in JP-A No. 4-298503, 8-53427, 8-239368, 10-182621 and Japan National Publication No. 8-501291; and compounds described in Research Disclosure No. 24239. So-called fluorescent brighteners that emit fluorescent light by absorbing UV rays, such as stilbene compounds and benzoxazole compounds, are also applicable.

The discoloration inhibitor may be used for improving the storability of an image, and examples thereof include organic type compounds and metal complex compounds. The organic discoloration inhibitors include hydroquinones, alkoxyphenols, dialkoxyphenols, phenols, anilines, amines, indanes, chromanes, alkoxyanilines and heterocyclic compounds. The metal complex discoloration inhibitors include nickel complexes and zinc complexes. More specifically, applicable compounds include those described in the patents cited in Research Disclosure No. 17643, Section VII, Items I to J; No. 15162; No. 18716, page 650, upper left column; No. 36544, page 527; No. 307105, page 872; and No. 15162, compounds included represented by the chemical formulae or examples described in pages 127 to 137 of JP-A No. 62-215272.

The antimildew agents include sodium dehydroacetate, sodium benzoate, sodium pyridinethion-1-oxide, p-hydroxy ethyl benzoate, 1,2-benzoisothiazolin-3-one, and the salts thereof. The content of antimildew agent is preferably from 0.02 to 1.00 mass % in the aqueous ink.

The pH adjusters include neutralizers such as organic base or inorganic alkali. The pH adjuster may improve the storability of the aqueous ink. The pH adjuster is preferably added at such an amount that the pH of the ink is from 6 to 10, more preferably from 7 to 10.

The surface tension adjusters include nonionic surfactants, cationic surfactants, anionic surfactants, and betaine surfactants.

The surface tension adjuster is preferably added in such an amount that the surface tension of the ink is from 20 to 60 mN/m, more preferably from 20 to 45 mN/m, and further preferably from 25 to 40 mN/m. When the surface tension adjuster is added in an amount in the above range, the ink may be dispensed in a favorable manner in an inkjet method.

The surfactants includes, as hydrocarbon surfactants, anionic surfactants such as fatty acid salt, alkyl sulfate, alkyl benzene sulfonate, alkyl naphthalene sulfonate, dialkyl sulfosucciniate, alkyl phosphate, formalin condensate of naphthalene sulfonate and polyoxyethylene alkyl sulfate, nonionic surfactants such as polyoxyethylene alkyl ether, polyoxyethylene alkyl allyl ether, polyoxyethylene fatty acid ester, sorbitan fatty acid ester, polyoxyethylene sorbitan fatty acid ester, polyoxyethylene alkyl amine, glycerin fatty acid ester and oxyethylene-oxypropylene block copolymer. Further, acetylene-type polyoxyethyleneoxide surfactants, such as SURFYNOL series (trade name, manufactured by Air Products & Chemicals, Inc.), and amine oxide-type amphoteric surfactants such as N,N-dimethyl-N-alkylamine oxide are also favorably used. Moreover, compounds described as a surfactant in JP-A No. 59-157636, pp. 37 to 38 and Research Disclosure No. 308119 (1989) are also applicable.

The anti-abrasion properties may be improved by using fluorine (fluoroalkyl) surfactants, silicone surfactants or the like, such as those described in JP-A No. 2003-322926, 2004-325707 and 2004-309806.

The aforementioned surface tension adjusters may also be used as a defoaming agent, and fluorine compounds, silicone compounds, chelate compounds such as EDTA are also applicable.

The following are exemplary embodiments of the invention, but the invention is not limited thereto.
1. An image recording method comprising:
    applying an aqueous pretreatment composition to a recording medium having a water absorption of 14 ml/m$^2$ or less at a contact time of 900 msec in accordance with the Bristow method, the aqueous pretreatment composition containing 10 mass % or more of a water-soluble organic solvent having a solubility parameter value of 13 or less, 1.5 mass % or more of resin particles, and water;
    forming a blocking layer on the recording medium by drying the aqueous pretreatment composition so that 70 mass % or more of water contained in the aqueous pretreatment composition evaporates within 900 msec from the initiation of the application of the aqueous pretreatment composition; and
    recording an image by jetting an aqueous ink on the blocking layer, the aqueous ink containing a pigment, resin particles, a water-soluble organic solvent, and water.

2. The image recording method according to 1, wherein the aqueous pretreatment composition further comprises a fixing agent that fixes a component contained in the aqueous ink.
3. The image recording method according to 2, wherein a mass ratio F/L, of the fixing agent F to the resin particles L contained in the aqueous pretreatment composition, is from 0.5 to 6.5.
4. The image recording method according to 2, wherein the fixing agent comprises an acid having a valency of 2 or more.
5. The image recording method according to 1, wherein the resin particles contained in the aqueous pretreatment composition comprise polyester resin particles.
6. The image recording method according to 1, wherein the resin particles contained in the aqueous pretreatment composition have a glass transition temperature of 50° C. or more.
7. The image recording method according to 1, wherein the recording medium comprises coated paper.
8. An ink set for use in the image recording method according to 1, comprising:
    an aqueous pretreatment composition containing 10 mass % or more of a water-soluble organic solvent having a solubility parameter value of 13 or less, 1.5 mass % or more of resin particles, and water; and
    an aqueous ink containing a pigment, resin particles, a water-soluble organic solvent, and water.
9. The ink set according to 8, wherein the aqueous pretreatment composition further comprises a fixing agent that fixes a component contained in the aqueous ink.
10. The ink set according to 9, wherein a mass ratio F/L, of the fixing agent F to the resin particles L contained in the aqueous pretreatment composition, is from 0.5 to 6.5.
11. The ink set according to 9, wherein the fixing agent comprises an acid having a valency of 2 or more.
12. The ink set according to 8, wherein the resin particles contained in the aqueous pretreatment composition comprise polyester resin particles.
13. The ink set according to 8, wherein the resin particles contained in the aqueous pretreatment composition have a glass transition temperature of 50° C. or more.
14. A recorded material recorded by the image recording method according to claim 1.
15. The recorded material according to 14, wherein the aqueous pretreatment composition further comprises a fixing agent that fixes a component contained in the aqueous ink.
16. The recorded material according to 15, wherein a mass ratio F/L, of the fixing agent F to the resin particles L contained in the aqueous pretreatment composition, is from 0.5 to 6.5.
17. The recorded material according to 15, wherein the fixing agent comprises an acid having a valency of 2 or more.
18. The recorded material according to 14, wherein the resin particles contained in the aqueous pretreatment composition comprise polyester resin particles.
19. The recorded material according to 14, wherein the resin particles contained in the aqueous pretreatment composition have a glass transition temperature of 50° C. or more.
20. The recorded material according to 14, comprising coated paper.

EXAMPLES

In the following, the present invention will be described in further details with reference to the examples. However, the present invention is not limited to these examples. Moreover, the term "part" refers to "part by mass" unless otherwise noted.

Examples 1 to 4

Comparative Examples 1 to 8

Preparation of Aqueous Ink
<Cyan Ink C1-1>
Preparation of Cyan Pigment Dispersion C1

Cyan ink C1-1 was prepared in accordance with the following process. 6 parts of styrene, 11 parts of stearyl methacrylate, 4 parts of styrene macromer (AS-6, trade name, manufactured by Toagosei Co., Ltd.), 5 parts of BLEMMER PP-500 (trade name, polypropylene glycol methacrylate, manufactured by NOF Corporation), 5 parts of methacrylic acid, 0.05 parts of 2-mercapto ethanol, and 24 parts of methyl ethyl ketone were put in a reaction container to prepare a mixed solution.

Separately, 14 parts of styrene, 24 parts of stearyl methacrylate, 9 parts of styrene macromer (AS-6, trade name, manufactured by Toagosei Co., Ltd.), 9 parts of BLEMMER PP-500 (trade name, polypropylene glycol methacrylate, manufactured by NOF Corporation), 10 parts of methacrylic acid, 0.13 parts of 2-mercapto ethanol, 56 parts of methyl ethyl ketone, and 1.2 parts of 2,2'-azobis(2,4-dimethylvaleronitrile) were put in a dripping funnel to prepare a mixed solution.

In a nitrogen atmosphere, the mixed solution in the reaction container was heated to 75° C. while stirring, and the mixed solution in the dripping funnel was gradually dripped into the reaction container, taking one hour. Two hours after the completion of the dripping, 12 parts of methyl ethyl ketone in which 1.2 parts of 2,2'-azobis(2,4-dimethylvaleronitrile) was dissolved was dripped into the reaction container, taking three hours. The mixed solution was further maintained at 75° C. for two hours, and then aged at 80° C. for two hours, thereby obtaining a polymer dispersion.

The weight average molecular weight of the polymer in the obtained polymer dispersion was measured in the following manner. Part of the polymer dispersion was isolated by removing the solvent, and the obtained solid content was diluted with tetrahydrofuran to 0.1 mass % to obtain a sample. The sample was subjected to high-speed GPC (gel permeation chromatography) using HLC-8220 GPC (columns: TSKgeL Super HZM-H, TSKgeL Super HZ4000, TSKgeL Super HZ2000, connected in series, manufactured by Tosoh Corporation). The weight average molecular weight of the polymer as measured was 25,000 (polystyrene-converted).

Next, 5.0 g (solid content) of the obtained polymer dispersant, 10.0 g of cyan pigment (Pigment Blue 15:3, trade name, manufactured by Dainichiseika Color & Chemicals Mfg. Co., Ltd.), 40.0 g of methyl ethyl ketone, 8.0 g of 1 mol/L (liter) sodium hydroxide, and 82.0 g of ion exchange water were put in a vessel together with 300 g of 0.1 mm zirconia beads, and were dispersed for 6 hours at 1,000 rpm with a disperser Ready Mill (trade name, manufactured by Aimex Co., Ltd.). The resulting dispersion was condensed under reduced pressure by an evaporator until methyl ethyl ketone was sufficiently removed, and was further condensed until the concentration of pigment reached 10%. Cyan pigment dispersion C1 (water-insoluble fine particles A) was thus obtained.

The volume average particle size (secondary particle size) of cyan dispersion C1 as measured by a dynamic light scattering method using a particle size distribution meter MICROTRAC Version 10.0.2-211 BH, trade name, manufactured by Nikkiso Co., Ltd.) was 77 nm.

After the preparation of cyan pigment dispersion C1, cyan ink C1-1 having the following composition was prepared by mixing cyan pigment dispersion C1 with water-insoluble fine particles B (acrylic latex, JOHNCYL 537, coarse particles had been removed by centrifugal separation), organic solvent, surfactant and ion exchange water, and then removing coarse particles from the mixture using a 5-μm filter.

| <Composition of cyan ink C1-1> | |
|---|---|
| Cyan pigment (Pigment Blue 15:3, trade name, manufactured by Dainichiseika Color & Chemicals Mfg. Co., Ltd.) Polymer dispersion | 4 mass % |
|  | 2 mass % |
| Acrylic latex (JOHNCTYL 537, trade name, Tg: 49° C., manufactured by BASF Japan, Ltd.) | 8 mass % |
| Diethylene glycol monoethyl ether (SP value: 10.9, manufactured by Wako Pure Chemical Industries, Ltd.) | 10 mass % |
| Glycerin (manufactured by Wako Pure Chemical Industries, Ltd.) | 20 mass % |
| Surfactant (OLFINE E1010, manufactured by Nissin Chemical Industry Co., Ltd.) | 1 mass % |
| Ion exchange water | 55 mass % |

<Preparation of Cyan Ink C1-2>

Cyan ink C1-2 was prepared in a similar manner to cyan ink C1-1, except that JOHNCTYL 537 was changed to the same amount of JOHNCRYL 551 (trade name, Tg: 9° C., manufactured by BASF Japan, Ltd.).

<Preparation of Cyan Ink C2-1>

26.7 g of commercially available 15% cyan pigment dispersion (CABOJET 250), 8 g (solid content) of acrylic latex, 20 g of glycerin, 10 g of diethylene glycol monoethyl ether, and 1 g of surfactant (OLFINE E1010) were mixed and ion exchange water was further added thereto so that the total amount of the mixture was 100 g, thereby obtaining a cyan ink C2-1 having the following composition.

| <Composition of cyan ink C2-1> | |
|---|---|
| Cyan pigment dispersion (CABOJET 250, manufactured by Cabot Corporation) | 4 mass % |
| Acrylic latex (JOHNCTYL 537, trade name, Tg: 49° C., manufactured by BASF Japan, Ltd.) | 8 mass % |
| Diethylene glycol monoethyl ether (SP value: 10.9, manufactured by Wako Pure Chemical Industries, Ltd.) | 10 mass % |
| Glycerin (manufactured by Wako Pure Chemical Industries, Ltd.) | 20 mass % |
| Surfactant (OLFINE E1010, manufactured by Nissin Chemical Industry Co., Ltd.) | 1 mass % |
| Ion exchange water | 57 mass % |

Preparation of Magenta Ink M1-1

400 g of magenta pigment (CROMOPHTAL JET MAGENTA DMQ, trade name, manufactured by Ciba Japan, K.K.), 40 g of sodium oleate (manufactured by Wako Pure Chemical Industries, Ltd.), 200 g of glycerin, and 1,360 g of ion exchange water were mixed and kneaded in a mortar for one hour, and the mixture was roughly dispersed by an ultrasonic disperser equipped with a small-scale stirrer (US-600CCVP, trade name, manufactured by Nippon Seiki Co., Ltd., 600 W, ultrasonic-wave oscillator: 50 mm) for 20 minutes.

The obtained dispersion was put in a mill (SUPER APEX MILL, type: SAM-1, trade name, manufactured by Kotobuki Industries, Co., Ltd.) with 1.3 kg of 0.05 mm zirconia beads, and was dispersed at 2,500 rpm and a process flow rate of 15 L/h for 160 minutes. Thereafter, the resulting dispersion was filtered by a 32-μm filtering cloth to obtain a magenta pigment dispersion M1 (water-insoluble fine particles A) at 20 mass %. The average particle diameter of magenta pigment dispersion M1 as measured in the same manner as that in cyan pigment dispersion C1 was 70 nm.

After the preparation of magenta pigment dispersion M1, magenta ink M1-1 was prepared by mixing magenta pigment dispersion M1 with water-insoluble fine particles B (acrylic latex, JOHNCYL 537, coarse particles had been removed by centrifugal separation), organic solvent, surfactant and ion exchange water, and then removing coarse particles from the mixture using a 5-μm filter.

| <Composition of magenta ink M1-1> | |
|---|---|
| Magenta pigment (CROMOPHTAL JET MAGENTA DMQ) | 4 mass % |
| Sodium oleate (dispersant) | 0.4 mass % |
| Acrylic latex (JOHNCTYL 537, trade name, Tg: 49° C., manufactured by BASF Japan, Ltd.) | 8 mass % |
| Diethylene glycol monoethyl ether (SP value: 10.9, manufactured by Wako Pure Chemical Industries, Ltd.) | 10 mass % |
| Glycerin (manufactured by Wako Pure Chemical Industries, Ltd.) | 20 mass % |
| Surfactant (OLFINE E1010, manufactured by Nissin Chemical Industry Co., Ltd.) | 1 mass % |
| Fluorine-based surfactant 1 (following structure) | 0.1 mass % |
| Ion exchange water | 56.5 mass % |

Fluorine-Based Surfactant 1

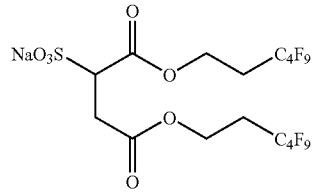

Preparation of Aqueous Pretreatment Composition

Aqueous pretreatment compositions B-1 to B-6 were prepared by mixing the following components shown in Table 1.

Image Recording and Evaluation

Image recording was performed using the ink and aqueous pretreatment composition obtained above, and the recorded image was evaluated in terms of image quality and curling in accordance with the following process.

<Image Recording>

The inkjet recording apparatus used for image recording includes, as shown in FIG. 1, pretreatment composition application unit 12 equipped with composition ejection head 12S for ejecting the aqueous pretreatment composition, pretreatment composition drying zone 13 for drying the applied aqueous pretreatment composition, ink ejection unit 14 for ejecting aqueous ink of each color, ink drying zone 15 for drying the ejected aqueous ink, and image fixing unit 16 provided with pressing rollers for fixing the dried image by applying heat and pressure, in a delivery direction of a recording medium (indicated by an arrow in the drawing).

Pretreatment composition drying zone 13 includes an air blower that blows the recording side of recording medium with an air and an infrared heater on the side of non-recording surface of recording medium (not shown in the drawing), at which 70 mass % or more of water contained in the applied aqueous pretreatment composition can be evaporated within 900 msec from the application of the aqueous pretreatment composition by adjusting the temperature and air volume. Ink ejection unit 14 includes black ink ejection head 30K, cyan ink ejection head 30C, magenta ink ejection head 30M and yellow ink ejection head 30Y in the order of delivery direction (indicated by an arrow in the drawing). Each ejection head is a full-line type head of 1200 dpi/10-inch width (driving frequency: 25 kHz, delivery speed of recording medium: 530 mm/sec) and recording can be performed by ejecting ink of each color by a single-path method in a main-scanning direction. The temperature of pressing rollers 40A and 40B was maintained at 80° C.

The aqueous pretreatment composition and inks obtained above were put in storage tanks (not shown) connected to pretreatment composition ejection head 12S, cyan ink ejection head 13C and magenta ink ejection head 13M, respectively, and a solid image and a line image of 1200 dpi were recorded on a recording medium. The aqueous pretreatment composition was applied to the recording medium at an amount of 5 ml/m$^2$. ULITE (trade name, manufactured by Nippon Paper Industries Co., Ltd., weight: 84.5 g/m$^2$) and XEROX 4024 (trade name, non-coated paper, manufactured by Fuji Xerox Co., Ltd.) were used as the recording medium. The amount of water absorption at a contact time of 900 msec measured by a Bristow method are shown in Table 2. In the recording, the aqueous pretreatment composition, cyan ink

TABLE 1

| | Fixing Agent (mass %) | Latex (mass %) | Surfactant (mass %) | Water-soluble organic solvent Type (mass %) | SP value [(cal/cm$^3$)$^{0.5}$] | Other component (mass %) |
|---|---|---|---|---|---|---|
| B-1 | Malonic acid (10) | PLAS COAT Z-561 (4) | Fluorine-based surfactant 1 (1) | Diethylene glycol monoethyl ether (20) | 10.9 | Water (65) |
| B-2 | Malonic acid (10) | — | Fluorine-based surfactant 1 (1) | — | — | Water (89) |
| B-3 | Malonic acid (10) | PLAS COAT Z-561 (4) | Fluorine-based surfactant 1 (1) | — | — | Water (85) |
| B-4 | Malonic acid (10) | PLAS COAT Z-561 (4) | Fluorine-based surfactant 1 (1) | Dipropylene glycol (20) | 13.3 | Water (65) |
| B-5 | Malonic acid (7) | PLAS COAT Z-561 (1) | Fluorine-based surfactant 1 (1) | Diethylene glycol monoethyl ether (20) | 10.9 | Water (71) |
| B-6 | Malonic acid (10) | PLAS COAT Z-561 (4) | Fluorine-based surfactant 1 (1) | Diethylene glycol monoethyl ether (9) | 10.9 | Water (76) | and magenta ink were ejected at a resolution of 1200 dpi×600 dpi, and a drop amount of 3.5 pl. The lines are formed at a width of 1, 2 and 4 dots, respectively, at 1200 dpi by ejecting ink in a single-path method in a main-scanning direction, and the solid images are formed by ejecting the ink to the entire surface of the sample obtained by cutting the recording medium in A5 size.

The recording was performed in the following process. An aqueous pretreatment composition was jetted from pretreatment composition ejection head 12S onto a recording medium in a single-path method, and then dried at pretreatment composition drying zone 13. The recording medium passed through pretreatment drying zone 13 within 900 msec from the commencement of ejection. At pretreatment composition drying zone 13, the recording side of recording medium was blown with a hot air of 120° C. by a blower at an arbitrary air volume while heating the backside of recording medium by an infrared heater so that the temperature of the film formed from the pretreatment composition was 40 to 45° C. Subsequently, cyan ink and magenta ink were jetted from cyan ink ejection head 30C and magenta ink ejection head 30M, respectively, by a single-path method to form an image. The image-recorded side of recording medium was dried by blowing with a hot air of 120° C. at 5 m/sec for 15 seconds while heating the backside in a similar manner to the above. After the drying, heat-pressing was performed for three times to fix the image using pressing rollers 40A and 40B made from PFA (a fully-fluorinated thermoplastic resin, a copolymer of tetrafluoroethylene and perfluoroalkoxyethylene) that had been heated to 80° C., at a nip pressure of 1.0 mPa. The combination of recording medium, aqueous pretreatment composition and ink used in the examples are shown in Table 2.

Evaluation

1. Image Quality (Delineation)

The delineation of lines having a width of 1, 2 and 4 dots recorded on the recording medium in the above process was evaluated in accordance with the following criteria. The results are shown in Table 2.

1: All lines show a uniform width.

2: 1-dot line shows a uniform width, but irregularities in line width, intermission in line or gathering of ink is partly observed in 2-dot and 4-dot lines.

3: 1-dot line shows a uniform width, but irregularities in line width, intermission in line or gathering of ink is observed in the entire portion of 2-dot and 4-dot lines.

4: Irregularities in line width, intermission in line or gathering of ink is shown in the entire portion of all lines.

2. Curling

A sample of A5 size with a solid image formed on the entire surface thereof was left to stand at 55% RH for 12 hours. Thereafter, the sample was placed on a plane and the height of each corner of the sample from the plane was measured and evaluated in accordance with the following criteria. When the sample was curled so that the center portion thereof was lifted upwards, the sample was turned upside down so that the corners were positioned upward for the measurement.

1. The arithmetic average of height at four corners is less than 0.3 cm.

2. The arithmetic average of height at four corners is from 0.3 cm to less than 0.5 cm.

3. The arithmetic average of height at four corners is from 0.5 cm to less than 0.7 cm.

4. The arithmetic average of height at four corners is 0.7 cm or more.

TABLE 2

| | Recording medium (900 msec absorption) | Aqueous ink | Aqueous pretreatment composition | | Evaluation | |
|---|---|---|---|---|---|---|
| | | | Type | Water evaporation *1 | Curling | Delineation |
| Example 1 | ULITE (11 ml/m$^2$) | C1-1 | B-1 | 75 mass % | 1 | 1 |
| Example 2 | ULITE (11 ml/m$^2$) | C1-2 | B-1 | 75 mass % | 1 | 1 |
| Example 3 | ULITE (11 ml/m$^2$) | C2-1 | B-1 | 75 mass % | 1 | 2 |
| Example 4 | ULITE (11 ml/m$^2$) | M1-1 | B-1 | 75 mass % | 1 | 1 |
| Com. Example 1 | XEROX 4024 (20 ml/m$^2$) *2 | C1-1 | B-2 | 80 mass % | 4 | 4 |
| Com. Example 2 | ULITE (11 ml/m$^2$) | C1-1 | B-3 | 75 mass % | 3 | 3 |
| Com. Example 3 | XEROX 4024 (20 ml/m$^2$) *2 | C1-1 | B-1 | 75 mass % | 3 | 3 |
| Com. Example 4 | ULITE (11 ml/m$^2$) | C1-1 | B-1 | 65 mass % | 3 | 1 |
| Com. Example 5 | ULITE (11 ml/m$^2$) | C1-1 | — | — | 4 | 3 |
| Com. Example 6 | ULITE (11 ml/m$^2$) | C1-1 | B-4 | 75 mass % | 3 | 1 |
| Com. Example 7 | ULITE (11 ml/m$^2$) | C1-1 | B-5 | 75 mass % | 4 | 2 |
| Com. Example 8 | ULITE (11 ml/m$^2$) | C1-1 | B-6 | 75 mass % | 3 | 3 |

*1 Amount of water evaporation within 900 msec from the commencement of application of aqueous pretreatment composition at pretreatment composition ejection unit.
*2 XEROX 4024 is not coated paper.

As shown in Table 2, Examples 1 to 4 exhibit suppressed curling after image recording and high-quality images with excellent reproducibility are achieved. On the other hand, Comparative Examples 1 to 8 fail to improve image quality while suppressing curling.

All publications, patent applications, and technical standards mentioned in this specification are herein incorporated by reference to the same extent as if each individual publication, patent application, or technical standard was specifically and individually indicated to be incorporated by reference.

What is claimed is:

1. An image recording method comprising:

applying an aqueous pretreatment composition to a recording medium having a water absorption of 14 ml/m$^2$ or less at a contact time of 900 msec in accordance with the Bristow method, the aqueous pretreatment composition containing 10 mass % or more of a water-soluble organic solvent having a solubility parameter value of 13 or less, 1.5 mass % or more of resin particles, and water;

forming a blocking layer on the recording medium by drying the aqueous pretreatment composition so that 70 mass % or more of water contained in the aqueous pretreatment composition evaporates within 900 msec from the initiation of the application of the aqueous pretreatment composition; and recording an image by jetting an aqueous ink on the blocking layer, the aqueous ink containing a pigment, resin particles, a water-soluble organic solvent, and water.

2. The image recording method according to claim 1, wherein the aqueous pretreatment composition further comprises a fixing agent that fixes a component contained in the aqueous ink.

3. The image recording method according to claim 2, wherein a mass ratio F/L, of the fixing agent F to the resin particles L contained in the aqueous pretreatment composition, is from 0.5 to 6.5.

4. The image recording method according to claim 2, wherein the fixing agent comprises an acid having a valency of 2 or more.

5. The image recording method according to claim 1, wherein the resin particles contained in the aqueous pretreatment composition comprise polyester resin particles.

6. The image recording method according to claim 1, wherein the resin particles contained in the aqueous pretreatment composition have a glass transition temperature of 50° C. or more.

7. The image recording method according to claim 1, wherein the recording medium comprises coated paper.

8. The image recording method according to claim 7, wherein the coated paper comprises a base paper formed from cellulose and a coating layer formed on the base paper.

* * * * *